US007760958B2

(12) United States Patent
Sato et al.

(10) Patent No.: US 7,760,958 B2
(45) Date of Patent: Jul. 20, 2010

(54) IMAGE PROCESSING APPARATUS AND IMAGE PROCESSING METHOD

(75) Inventors: Yoshitake Sato, Nagano-ken (JP); Tadashi Furuhata, Nagano-ken (JP); Masahiro Katagiri, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1036 days.

(21) Appl. No.: 11/458,311

(22) Filed: Jul. 18, 2006

(65) Prior Publication Data

US 2007/0019243 A1 Jan. 25, 2007

(30) Foreign Application Priority Data

Jul. 20, 2005 (JP) ............................ 2005-209499

(51) Int. Cl.
*G06K 9/40* (2006.01)

(52) U.S. Cl. ....................... 382/254; 382/169; 382/171; 382/172; 382/237; 382/263; 358/3.27

(58) Field of Classification Search ................. 348/252, 348/254, 606, 625; 358/3.1, 3.27; 382/169, 382/171, 172, 237, 254, 263; 386/34
See application file for complete search history.

(56) References Cited

U.S. PATENT DOCUMENTS 4,695,884 A * 9/1987 Anastassiou et al. ........ 348/615
5,912,992 A 6/1999 Sawada et al.

FOREIGN PATENT DOCUMENTS

| | | |
|---|---|---|
| JP | 644404 A | 2/1994 |
| JP | 9261464 | 10/1997 |
| JP | 1166293 | 3/1999 |
| JP | 2004123117 | 4/2004 |

* cited by examiner

*Primary Examiner*—Matthew C Bella
*Assistant Examiner*—Gregory F Cunningham
(74) *Attorney, Agent, or Firm*—Rosalio Haro

(57) ABSTRACT

Background images are removed and only desired payment information is extracted from a grayscale image of a check or similar financial instrument. A density distribution improvement process applied to grayscale raw image data 40 acquired by scanning a check corrects the density distribution of the raw image data 40 to separate the density range of the desired payment information from the density range of the background image. A threshold level 44 for clearly separating the payment information from the background image is then calculated from the characteristics of the density distribution of the grayscale improved image data 42 acquired by the density distribution improvement process. Histograms of the density distributions are used to determine the characteristics of the density distribution. The improved image data 42 is then converted to binary image data 46 using the threshold level 44.

24 Claims, 7 Drawing Sheets

$$f'(i)=\frac{5\sum_{n=i-2}^{i+2} nf(n) - (\sum_{n=i-2}^{i+2} n)(\sum_{n=i-2}^{i+2} f(n))}{5\sum_{n=i-2}^{i+2} n^2 - (\sum_{n=i-2}^{i+2} n)^2}$$

Equation 1

FIG. 11

IMAGE PROCESSING APPARATUS AND IMAGE PROCESSING METHOD

RELATED APPLICATIONS

Japanese patent application No.(s) 2005-209499, is hereby incorporated by reference in its entirety.

BACKGROUND OF THE INVENTION

1. Field of the Invention

The present invention relates to an apparatus and a method for processing image data containing a background image and a desired foreground image.

2. Description of the Related Art

A device that processes checks, for example, as described in Japanese Unexamined Patent Appl. Pub. 2004-123117 is one example of an image processing apparatus. This check processing device optically scans a check or other type of financial instrument to capture an image of the instrument. To reduce the size of the image data, the raw image data from the scanned instrument (such as gray scale image data) is digitized to produce a two-valued (black and white) image of the instrument, which is assumed to be a check below. Particular information on the check (such as the bank name, account number, amount, payee, payer name and payer signature, referred to as the "payment information" below) must be clearly visible in the digitized image data. Instruments such as checks typically have a background image, which may be a simple pattern or a picture, for example, printed on the front, and the payment information is printed or written over this background image.

The technology taught in Japanese Unexamined Patent Appl. Pub. 2004-123117 is characterized by dynamically changing the threshold level used for digitizing the raw image data based on the image characteristics of the specific check so that the background image can be removed from the raw image data and a clear image of the desired payment information that is being read can be extracted. More specifically, selected parts of the check are scanned before scanning the entire check to generate a histogram of the density (brightness) distribution in the image data captured from those selected parts. The threshold level used for digitizing is then calculated based on this histogram.

The technology taught in Japanese Unexamined Patent Appl. Pub. 2004-123117 for dynamically adjusting the digitizing threshold level based on image characteristics in the raw image data is particularly effective for extracting a desired foreground image, such as the payment information on a check, from the raw image data of the check. However, this technology leaves a number of problems.

First, the payment information on a check often contains image elements that are finer than the scanning resolution (such as fine line elements that are narrower than the width of one pixel in the scanned image data), and such ultrafine line elements are lost by the digitizing process. More specifically, such fine image elements are expressed as low density gray image elements, and are converted to white pixels, that is, deleted, by the digitizing process.

Second, the background images on checks and other instruments vary widely, the density distribution differs with each background image, and the density range of the background image may overlap the density range of the foreground image (the check payment information). As a result, the digitizing process also extracts a part of the background image as a black area together with the desired foreground image. If the foreground image overlaps the part of the background image that is extracted as a black area, the foreground image cannot be distinguished from the background image in the digitized image data.

This problem is not limited to processing financial instruments, and also occurs when scanning documents and in other image processing applications.

SUMMARY OF THE INVENTION

An object of the present invention is therefore to improve the accuracy of image processing used to remove a background image and extract a foreground image from image data containing both a background image and a foreground image.

Another object of the present invention is to improve the accuracy of image processing used to remove the background image and extract an image of desired text information from multivalued image data such as a financial instrument or other document.

An image processing apparatus according to a first aspect of the invention has a density distribution improvement means for receiving grayscale raw image data containing both background image and foreground image information, improving the density distribution of the raw image data to increase the difference between a density distribution range of the background image and a density distribution range of the foreground image, and generating grayscale improved image data; a threshold level calculation means for receiving the improved image data and calculating a threshold level for two-level digital conversion based on a density distribution in the improved image data; and a digitizing means for receiving the improved image data and the threshold level, digitizing the improved image data using the threshold level, and outputting two-level image data.

An image processing method according to a second aspect of the invention has a density distribution improvement step for receiving grayscale raw image data containing both background image and foreground image information, improving the density distribution of the raw image data to increase the difference between a density distribution range of the background image and a density distribution range of the foreground image, and generating grayscale improved image data; a threshold level calculation step for receiving the improved image data and calculating a threshold level for two-level digital conversion based on a density distribution in the improved image data; and a digitizing step for receiving the improved image data and the threshold level, digitizing the improved image data using the threshold level, and outputting two-level image data.

By applying a density distribution improvement process to multilevel raw image data, the image processing apparatus and method of this aspect of the invention reduce the overlap of the background image density range and the foreground image density range, and more clearly separate the density ranges of the two images. Using the improved image data output from this density distribution improvement process, a threshold level is calculated and the improved image data is digitized using this threshold level. The result is a digital image from which the background image is more effectively removed and the foreground image is more clearly extracted.

The density distribution improvement process must therefore be applied before threshold level calculation and conversion to a binary image. In a preferred embodiment of the invention image sharpening or contrast enhancement are used as the density distribution improvement process, but the invention is not limited to these methods and other techniques can be used.

A noise removal process for removing noise can also be applied to the two-level image data output from the digitizing process. The likelihood of noise occurring in the digitized image is high when image sharpening or contract enhancement is used as the density distribution improvement process, and a noise removal process is therefore useful for acquiring a high quality digital image.

Further preferably, the threshold level calculation method detects a junction between the density range of the background image and the density range of the foreground image in the improved image data, and sets the threshold level in the junction. This junction can be calculated by calculating a histogram for the improved image data, and detecting the junction from slopes in the histogram.

The junction between the background image and foreground image is usually in a valley between a peak in the background image histogram and a peak in the foreground image histogram, and the border between the background image and foreground image can therefore be found from the slopes of these histograms.

Further alternatively, the threshold level can be calculated by calculating a histogram for the improved image data, finding transition points meeting specific conditions in the histogram, and setting the threshold level based on the transition points.

An image processing apparatus according to a third aspect of the invention has a density distribution improvement means for receiving grayscale raw image data for a document having information printed or written on paper containing a background image, improving the density distribution of the raw image data to increase the difference between a density distribution range of the background image and a density distribution range of the foreground image, and generating grayscale improved image data; a threshold level calculation means for receiving the improved image data and calculating a threshold level for two-level digital conversion based on a density distribution in the improved image data; and a digitizing means for receiving the improved image data and the threshold level, digitizing the improved image data using the threshold level, and outputting two-level image data.

An image processing method according to a fourth aspect of the invention has a density distribution improvement step for receiving grayscale raw image data for a document having information printed or written on paper containing a background image, improving the density distribution of the raw image data to increase the difference between a density distribution range of the background image and a density distribution range of the foreground image, and generating grayscale improved image data; a threshold level calculation step for receiving the improved image data and calculating a threshold level for two-level digital conversion based on a density distribution in the improved image data; and a digitizing step for receiving the improved image data and the threshold level, digitizing the improved image data using the threshold level, and outputting two-level image data.

The image processing apparatus and method according to these aspects of the invention can thus acquire a digital image in which the background image is more completely removed and only the information desired is more clearly extracted from a document image.

EFFECT OF THE INVENTION

The apparatus and method according to the first and second aspects of the invention improve the accuracy of image processing for removing a background image and extracting a desired foreground image from image data containing both a background image and a foreground image.

The apparatus and method according to the third and fourth aspects of the invention improve the accuracy of image processing for removing a background image and extracting an image of text information from grayscale image data scanned from a text document such as a check or other type of financial instrument.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 11 is an equation for calculating the slope of each pixel value i in histogram 110 of FIG. 9.

DESCRIPTION OF THE PREFERRED EMBODIMENTS

Figure 1:
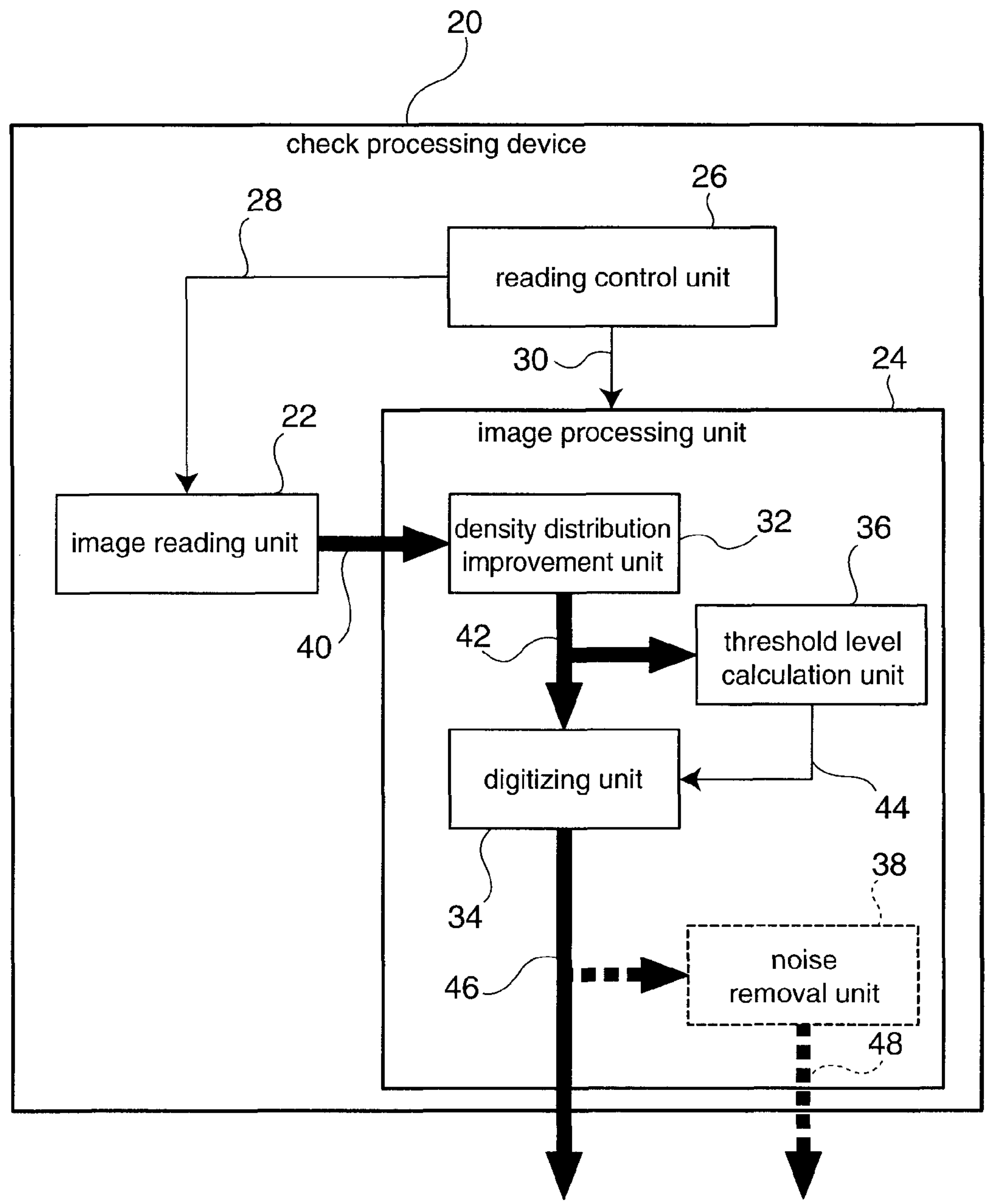
FIG. 1 is a block diagram showing the functional arrangement of the major parts of a first embodiment of an image processing apparatus according to the present invention.

FIG. 1 is a block diagram showing the functional arrangement of the major parts of a first embodiment of an image processing apparatus according to the present invention. This embodiment applies the invention to a check reading device for scanning a check and processing the scanned image of the check. This embodiment is simply for describing the invention, and it will be obvious to one with ordinary skill in the related art that the invention can also be applied to other uses, such as image processing programs for reading text documents other than checks, including bearer bonds and other financial instruments as well as documents.

As shown in FIG. 1, a check processing device 20 according to this embodiment of the invention has an image reading unit 22, an image processing unit 24, and a reading control unit 26.

The image reading unit 22 is a check image scanner such as known from the literature for optically scanning the face of a check set in the scanner and outputting raster image data ("raw image data" below) 40, which is a multilevel image (such as a grayscale image) of the check face.

The image processing unit 24 takes the raw image data 40 output from the image reading unit 22, processes the raw image data 40 according to the principle of this invention, and thus generates binary image data 46 (or 48).

The reading control unit 26 applies control signals 28 and 30 to the image reading unit 22 and image processing unit 24, respectively, to control operation of the image reading unit 22 and image processing unit 24.

The image processing unit 24 is described in further detail below.

The purpose of using this check processing device 20 is to produce a digital image of the check clearly presenting specific desired information written on the check (such as characters representing payment information including the bank name, account number, payment amount, payee, payer name and payer signature, and various numbers, as well as guide lines and text frames guiding where these characters are written). Some type of pattern or picture is typically preprinted in the background on the face of the check paper, and the payment information is printed or written on top of this background image. The raw image data 40 for the check output from the image reading unit 22 therefore contains both the background pattern or picture (referred to herein as the "background image") and an image of the desired information written in the foreground (referred to herein as the "foreground image"). The foreground image is usually written on top of the background image. Based on the purpose of using this check processing device 20, the background image is useless and only the foreground image (an image of the payment information written on the check) is wanted. The image processing unit 24 therefore processes the raw image data 40 from the check according to the principle of this invention to remove the background image from the raw image data 40 and as much as possible selectively extract only the foreground image.

To accomplish this image processing operation, the image processing unit 24 has a density distribution improvement unit 32, digitizing unit 34, and threshold level calculation unit 36. The raw image data 40 from the image reading unit 22 is first input to the density distribution improvement unit 32.

The density distribution improvement unit 32 receives the raw image data 40 (grayscale image data) and improves the density distribution of the raw image data 40 to increase the difference between the density distribution ranges of the background image and foreground image in the raw image data 40. The density of the foreground image is usually biased towards the high density range and the background image density is biased towards a lower density range than the foreground image. The density distribution improvement process therefore improves, or adjusts, the density distribution so that these biases are enhanced, or more specifically so that the density of the foreground image is further biased towards the high density range and the density of the background image is further biased towards the low density range. This reduces the overlap of the density distribution ranges of the background image and foreground image and separates the background and foreground images into more clearly different density ranges. Various methods can be used for this density distribution improvement process, and this embodiment of the invention uses an image sharpening or contrast enhancement method by way of example.

The grayscale image data 42 having an improved density distribution output from the density distribution improvement unit 32 (referred to below as the "improved image data") is input to the threshold level calculation unit 36 and digitizing unit 34.

The threshold level calculation unit 36 sets the threshold level 44 for clearly separating the background image and foreground image dynamically based on the image features of the improved image data 42, that is, based on the density distribution characteristic. More specifically, the threshold level calculation unit 36 creates a histogram of the density distribution for all parts of the improved image data 42, and based on this histogram calculates the threshold level 44 for sharply separating the background image and foreground image. Because the density distribution improvement unit 32 has already improved the density distribution of the improved image data 42 to separate the background image and foreground image into separate density ranges, the threshold level calculation unit 36 can determine a threshold level 44 enabling separating the background image and foreground image even better. This threshold level 44 is input to the digitizing unit 34.

The digitizing unit 34 then digitizes the improved image data 42 from the density distribution improvement unit 32 using the threshold level 44 from the threshold level calculation unit 36. Image areas in the improved image data 42 where the density is greater than or equal to the threshold level 44 are converted to black, and image areas where the density is less than the threshold level 44 are converted to white.

As described above, the density distribution is improved in the improved image data 42 to which this digitizing operation is applied so that the background image and foreground image are separated as much as possible into separate density ranges, and the threshold level 44 is set to sharply distinguish the background image and foreground image in the improved image data 42. As a result, the digitizing process converts the greater portion of the background image to the white range and converts the greater portion of the foreground image to the black range. The result is the foreground image desirably extracted in the binary image data 46.

The binary image data 46 output from the digitizing unit 34 is output from the image processing unit 24 externally to the check processing device 20.

As indicated by the dotted lines in FIG. 1, a noise removal unit 38 is added downstream from the digitizing unit 34 in a variation of this embodiment, and the binary image data 46 output from the digitizing unit 34 is input to the noise removal unit 38. The noise removal unit 38 removes noise contained in the binary image data 46 (such as fine black dots scattered in the white region and fine white dots scattered in the black region), and outputs a binary image data 48 from noise has been removed externally to the check processing device 20.

Figure 2A:
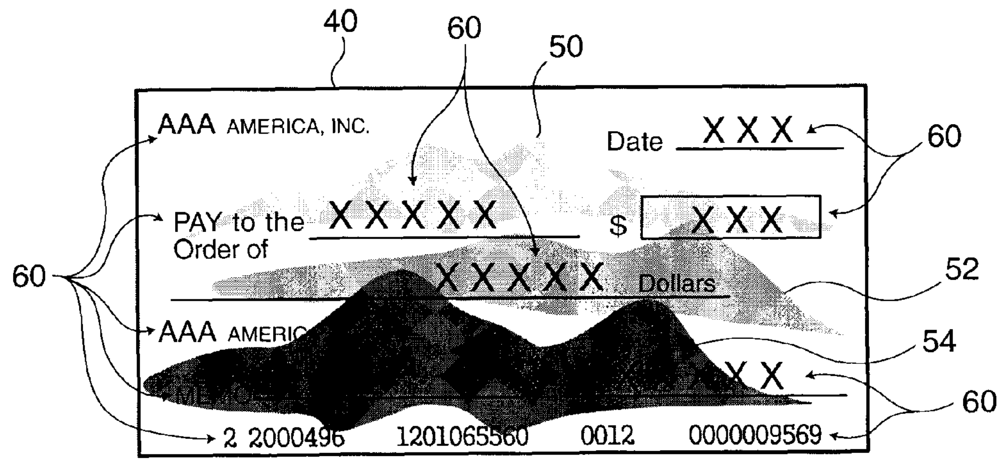
FIGS. 2A and 2B show for reference the change in the image when the raw image data 40 is digitized without first applying the density distribution improvement process of the invention.
Figure 2B:
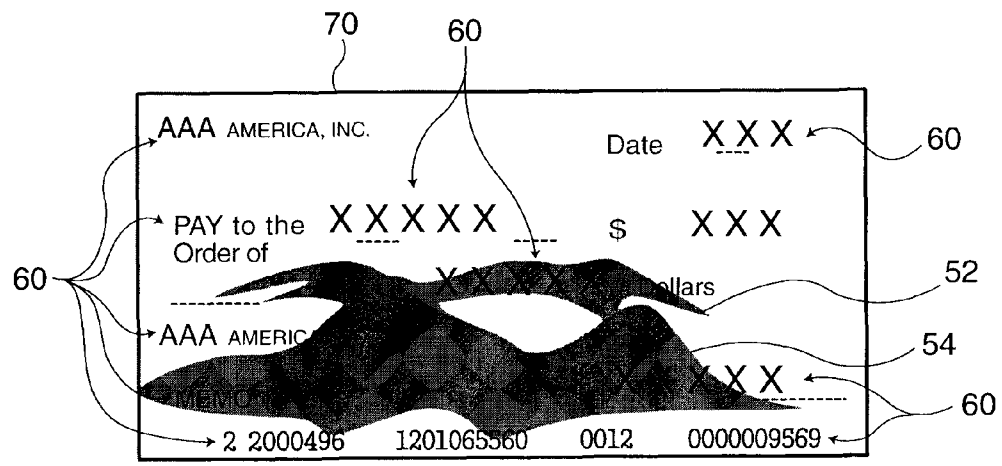
Figure 3A:
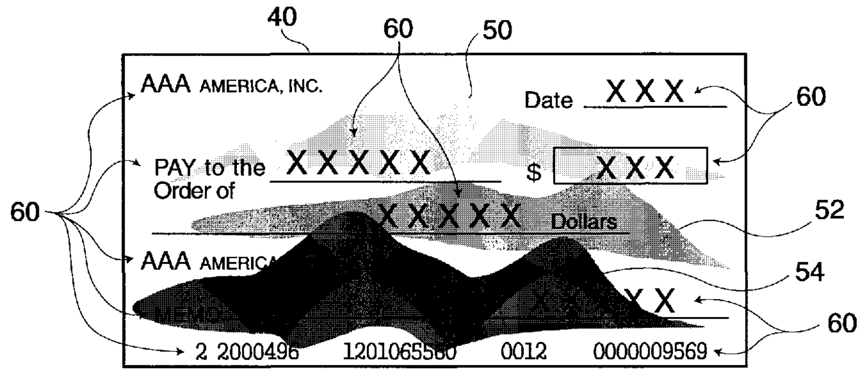
FIGS. 3A, 3B and 3C show the change in the image when the raw image data 40 is digitized after first applying the density distribution improvement process of the invention.
Figure 3B:
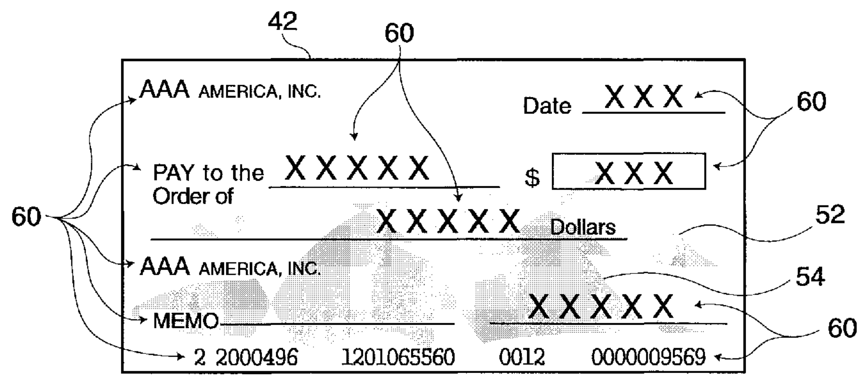
Figure 3C:
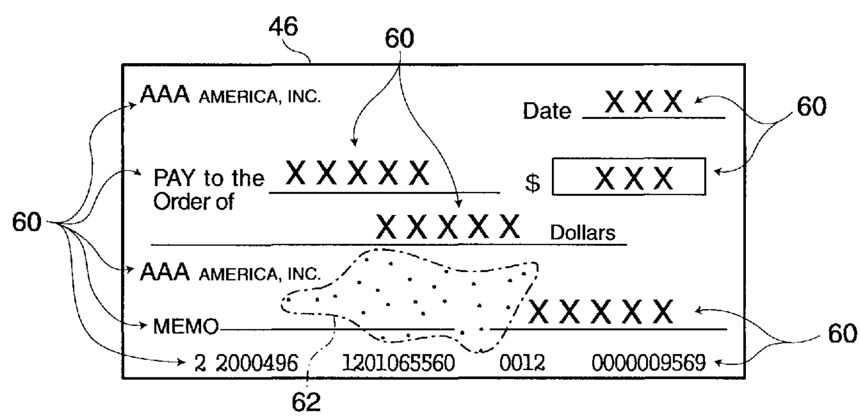

How image processing by the image processing unit 24 converts the check image is described below. FIGS. 2A and 2B show the change in the image when the raw image data 40 is digitized directly to a black and white image without first improving the density distribution. FIGS. 3A to 3C show the change in the image when the density distribution of the raw image data 40 is improved before conversion to a black and white digital image by this embodiment of the invention.

FIG. 2A and FIG. 3A both show the same raw image data 40 for the same check. As described above, the raw image data 40 is multilevel image data, such as a 256-level grayscale image. In this example the raw image data 40 contains a plurality of (three in this example) background images 50, 52, 54 and the density range is different in each of these background images. Furthermore, the density range of the first background image 50 is low, the density range of the second background image 52 is medium, and the density range of the third background image 54 is high in this example. The density ranges of these different background images 50, 52, 54 can overlap in part. A plurality of foreground images 60 (images of the desired information written or printed on the check) are also present in the raw image data 40. The density range of the foreground images 60 is higher than the density range of the third background image 54 but can overlap the density range of the third background image 54 in part. Some or all of the foreground images 60 spatially overlap the background images 50, 52, 54.

For comparison, digitizing the raw image data 40 shown in FIG. 2A to a two-level image without applying the density distribution improvement process is described first. This may result in digitized image data 70 as shown in FIG. 2B. Of the three background images 50, 52, 54, all of the lowest density first background image 50 is converted to white and is removed from the digitized image data 70, but most of the higher density third background image 54 and second background image 52 are converted to black together with the foreground images 60, making reading the foreground images 60 where the foreground images 60 overlap the background images difficult. Some of the guide lines and guide frames in the foreground images 60 that are finer than the scanning resolution are also not completely converted to black and are partially lost.

Some of the causes of this problem are described below. If the density range of the foreground images 60 and the density range of the third background image 54 partially overlap, clearly separating the foreground images 60 from background images 54 and 52 based on the density range is impossible. Furthermore, the density range of the second background image 52 partly overlaps the density range of the third background image 54, and the foreground images 60 and second background image 52 and third background image 54 are represented by a single peak in the histogram of the density distribution. In this situation the threshold level is set between the density range of the second background image 52 and the density range of the third background image 54. In addition, if the guide lines and frames in the foreground images 60 are finer than the scanning resolution, the density of the guide lines and frames in the raw image data 40 will be lower than the binary threshold level. The problem shown in FIG. 2B occurs when these factors come together.

As shown in FIG. 3A, FIG. 3B, and FIG. 3C, the present invention substantially eliminates this problem.

Image sharpening or contrast enhancement are used as the density distribution improvement process in this embodiment of the invention. When this process is applied, pixels with higher density than the surrounding pixels in the raw image data 40 are adjusted so that the pixel density is even higher. Conversely, pixels with lower density than the surrounding pixels are adjusted so that the pixel density is even lower. The density of most pixels in the foreground images 60 (particularly text and line elements in the check payment information) is higher than the surrounding image area. As a result, most parts of the foreground images 60 are adjusted to an even higher density level and thus emphasized. In the background images 50, 52, 54, however, pixels with higher and lower density than the surrounding pixels are mixed together, and many low density pixels populate even areas that to the eye appear to be high density. As a result, low density areas in the background images 50, 52, 54 are converted to an even lower density level. In high density areas in the background images 50, 52, 54 the low density portion increases, dots having higher density than the surrounding area are emphasized, and high density dots over a low density ground appear similarly to a pointillism or dot drawing.

The emphasized, high density foreground images 60 can be easily read visually in these dotted parts of the background image. From the perspective of the density distribution, this improvement adjusts the density range of the foreground images 60 to a higher density level and adjusts the density range of the background images 50, 52, 54 to a lower level. The overlap between the density ranges is thus reduced, and the density ranges can be more clearly separated. In the histogram of the density distribution (see the histogram 110 shown by way of example in FIG. 9), the peak of the foreground images 60 is in the high density range and the peak of the background images 50, 52, 54 is in the low density range, the valley between these peaks is more obvious than in the raw image data 40, and the peaks can therefore be more clearly separated. The result is the improved image data 42 as shown in FIG. 3B. The density level of the background images 50, 52, 54 is even lower in the improved image data 42, the level of the foreground images 60 is even higher, and the light guide lines and frames are heavy and clear.

The threshold level for two-level conversion is then determined based on this improved image data 42. In the density distribution histogram the peak of the foreground images 60 and the peak of the background images 50, 52, 54 are separated by a valley. This valley corresponds to the junction between the density level range of the foreground images 60 and the density level range of the background images 50, 52, 54, and the threshold level can therefore be set in this valley (junction).

The improved image data 42 is then converted to two-level data using this threshold level. Because the level of most pixels in the background images 50, 52, 54 is lower than the threshold level in the improved image data 42, those pixels are converted to white pixels. Because the level of most pixels in the foreground images 60 is above the threshold level, those pixels are converted to black pixels. The result is binary image data 46 such as shown in FIG. 3C. Note that almost all of the background images 50, 52, 54 has been removed and almost all of the foreground images 60 has been extracted.

Completely removing all of the background images 50, 52, 54 and completely extracting all of the foreground images 60 is in practice difficult with this process, and noise 62 is left in the binary image data 46. One of the main causes of such noise 62 is that the density distribution improvement process (such as the image sharpening process) renders parts of the background images 50, 52, 54 where the density level was originally high in a dotted pattern. More specifically, high density dots populate the area rendered like a dotted drawing, and these dots are converted by the two-level conversion process to black dots, that is, noise 62. Because this noise 62 does not present any practical problem identifying the foreground images 60 in the binary image data 46, the noise 62 can be left. Alternatively, a noise removal process can be applied to remove the noise 62.

Exemplary methods of implementing the threshold level calculation process and noise removal process described above are described below.

Figure 4:
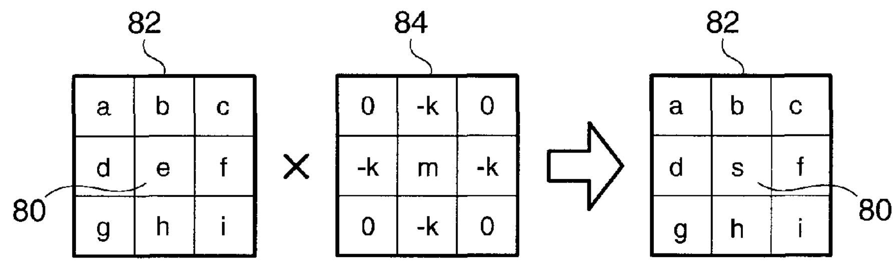
FIG. 4 describes a basic image sharpening process as one example of a density distribution improvement process.
Figure 5:
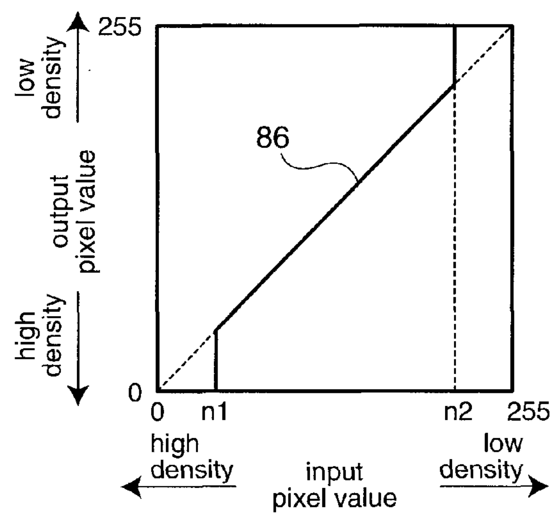
FIG. 5 describes an example of a tone curve conversion process that can be complementarily used in the image sharpening process.
Figure 6:
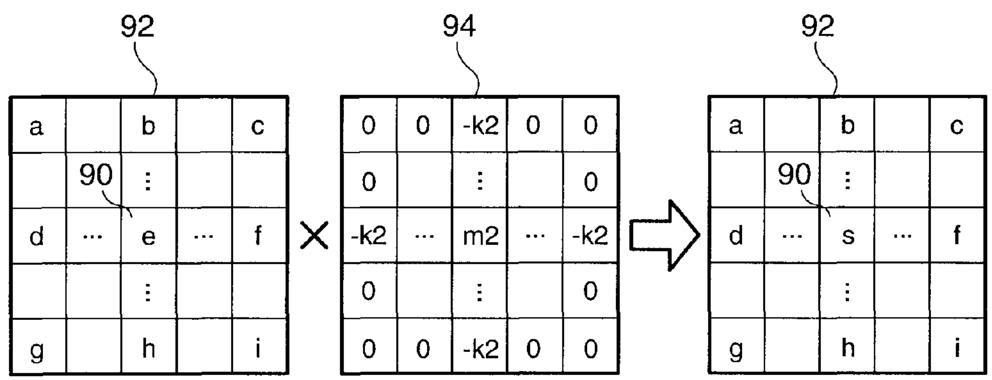
FIG. 6 shows another example of an image sharpening process.

FIG. 4, FIG. 5, and FIG. 6 show various methods of implementing the image sharpening process used in this embodiment of the invention. FIG. 4 describes a basic image sharpening technique.

As shown in FIG. 4, one target pixel 80 is selected from the raw image data 40, and a processing area 82 that is a matrix of a predetermined number of pixels including the target pixel 80 and surrounding pixels is selected. In this embodiment of the invention the processing area 82 is a 3×3 pixel matrix in which the target pixel 80 is the center pixel. Each pixel in the processing area 82 has a pixel value a to i where a lower pixel value represents a higher density level. An image sharpening filter 84 of the same matrix size as the processing area 82 is also predefined. The image sharpening filter 84 has coefficients corresponding to each pixel in the processing area 82 where the coefficient of the target pixel 80 is m, the coefficient of the four pixels adjacent vertically and horizontally to the target pixel 80 is −k, and the coefficient of the four corner pixels diagonally to the target pixel 80 is 0. Coefficient m and coefficient k are positive integers where m−4*k=1. This image sharpening filter 84 is then applied to the processing area 82. Applying the pixel sharpening calculation $$s=e*m-(b+d+f+h)*k$$

converts the original density level e of the target pixel to improved density level s.

This operation adjusts pixels that have a higher density level than the surrounding pixels to an even higher level, and adjusts pixels with a lower density level than the surrounding pixels to an even lower level. More particularly, the contrast between the target pixel and the surrounding pixels is enhanced. All pixels in the raw image data 40 are sequentially selected as the target pixel 80, this image sharpening calculation is applied to each pixel, and the raw image data 40 is thereby converted to improved image data 42.

FIG. 5 describes a tone curve process that can be used complementarily in the image sharpening process. In FIG. 5 the pixel values denote brightness. A pixel value of 0 is black, and a pixel value of 255 is white, and density therefore increases as the pixel value decreases.

A tone curve 86 with a characteristic such as shown in FIG. 5 is predefined for this tone curve process. The input pixels of the tone curve 86 are the pixels in the raw image data 40. This tone curve 86 is applied to all pixels in the raw image data 40. As a result, all pixels in a predetermined density range near the black level (pixels with a value of n1 or less) are converted to the maximum density level (black, a pixel value of 0), and all pixels in a predetermined density range near the white level (pixels with a value of n2 or higher) are converted to the minimum density level (white, a pixel value of 255). The density of all pixels between these two ranges (that is, pixels with value greater than n1 and lower than n2) is not changed. This tone curve process can be applied before the image sharpening filter 84 shown in FIG. 4 is applied (or the image sharpening filter 94 described below with reference to FIG. 6).

FIG. 6 describes another example of an image sharpening process.

As shown in FIG. 6, a target pixel 90 is selected from the raw image data 40, and a processing area 92 containing a plurality of pixels that surround the target pixel 90 and are separated at least two pixels from the target pixel 90 is selected. This processing area 92 is at least a 5×5 pixel matrix. An image sharpening filter 94 of the same matrix size as the processing area 92 is predefined. This image sharpening filter 94 contains a coefficient for the target pixel 90, and coefficients for the plural pixels surrounding the 9 at the outermost edges of the processing area 92. The coefficient of the target pixel 90 is m2, the coefficient of the four pixels offset vertically and horizontally to the target pixel 80 is −k2, and the coefficient of the pixels is 0. Coefficient m2 and coefficient k2 are positive integers where m2−4*k2=1. This image sharpening filter 84 is then applied to the processing area 82. As described with reference to FIG. 4, all pixels in the raw image data 40 are sequentially selected as the target pixel 90, and the image sharpening filter 94 is applied to each processing area 92 having target pixel 90 at the center.

If a to i (where density increases as pixel value decreases) are the values of the pixels shown in processing area 92 in FIG. 6, applying the pixel sharpening calculation $$s=e*m-(b+d+f+h)*k$$

converts the original density level e of the target pixel to improved density level s.

Applying the image sharpening filter 94 shown in FIG. 6 adjusts pixels that have a higher density level than the surrounding pixels separated a specific distance from the target pixel to an even higher level, and adjusts pixels with a lower density level than the surrounding pixels separated a specific distance from the target pixel to an even lower level. More particularly, the contrast between the target pixel and the surrounding pixels separated a specific distance from the target pixel is enhanced.

The image sharpening filter 94 shown in FIG. 6 can be used together with the image sharpening filter 84 shown in FIG. 4 or instead of the image sharpening filter 84 shown in FIG. 4. A plurality of sizes of image sharpening filters 94 as shown in FIG. 6 can also be predefined and used together. Alternatively, the image sharpening filter 94 shown in FIG. 6 can be defined and coefficients for the intermediate pixels (denoted by three dots, "...", in FIG. 6) can be additionally defined to combine the image sharpening filter 84 shown in FIG. 4 or an image sharpening filter of a different matrix size in a single image sharpening filter 94.

Figure 7:
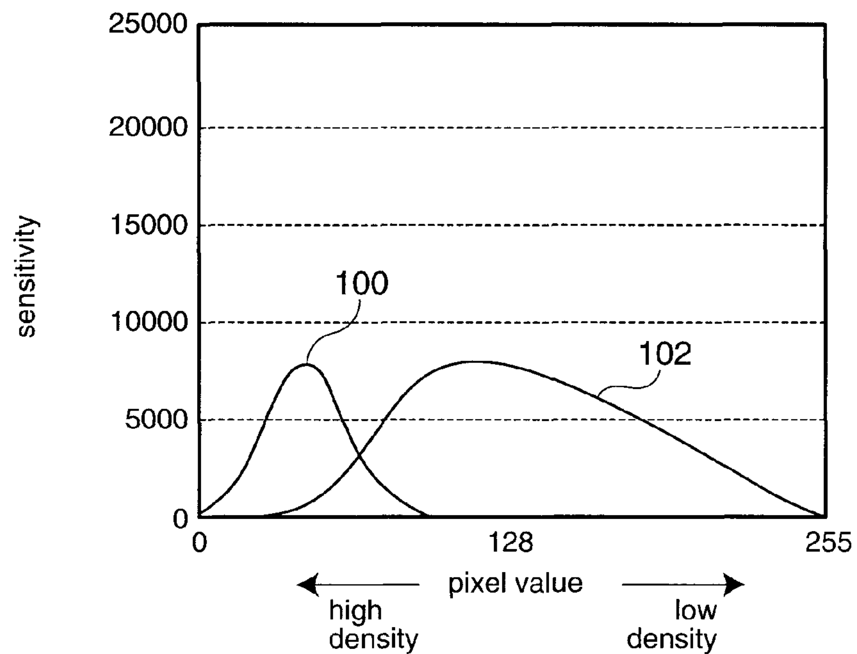
FIG. 7 shows density distribution histograms for the background image and foreground image in the raw image data.
Figure 8:
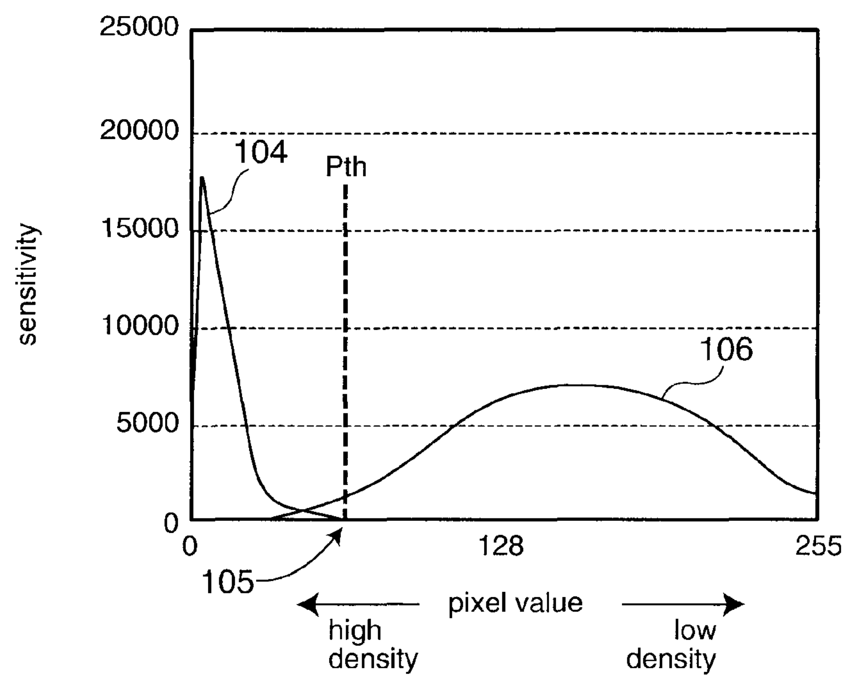
FIG. 8 shows density distribution histograms for the background image and foreground image in the improved image data.

FIG. 7 and FIG. 8 describe how the density distribution of the raw image data 40 changes as a result of applying a density distribution improvement process such as the image sharpening process described above.

FIG. 7 shows the histogram 100 of the density distribution of the foreground image in the raw image data 40 to which the density distribution improvement process is applied, and the histogram 102 of the density distribution of the background image. Histograms 100 and 102 partially overlap, and converting the raw image data 40 to a two-level image will therefore not satisfactorily separate the background image and foreground image.

FIG. 8 shows the density distribution histogram 104 of the foreground image and the histogram 106 of the density distribution of the background image in the improved image data 42 after applying the density distribution improvement process to raw image data 40 represented by the histograms shown in FIG. 7. Compared with the raw image data 40, the histograms 104 and 106 are shifted to the high density and low density level sides, the area of the overlap between the histograms 104 and 106 is smaller, and the corresponding image areas are better separated. As a result, the background image and foreground image can be efficiently separated in the digitizing process by setting the threshold level Pth near the low density limit of the histogram 104 for the foreground image.

Figure 9:
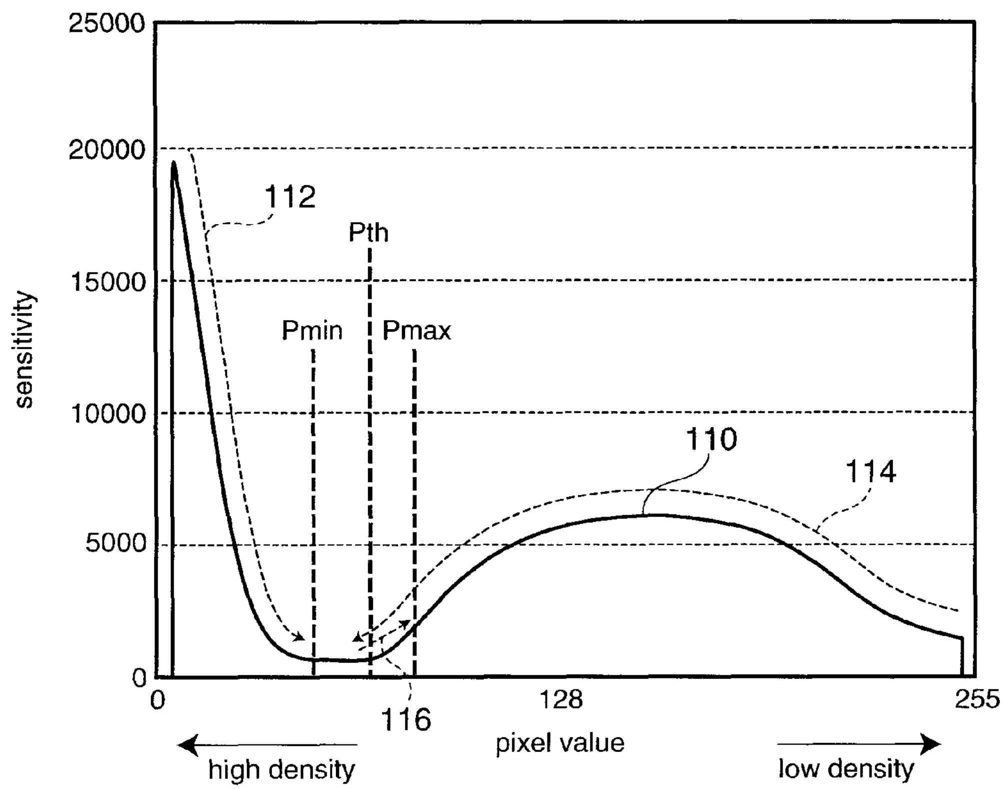
FIG. 9 describes a method of calculating the threshold level for two-level conversion.

FIG. 9 describes calculating the threshold level for two-level conversion based on the improved image data 42.

A histogram of the density distribution of the improved image data 42 is first calculated using the threshold level. This results in a histogram 110 such as shown in FIG. 9. This histogram 110 is a combination of the histogram 104 of the foreground image and the histogram 106 of the background image shown in FIG. 8. A frequency averaging process is applied to small density ranges to remove the effect of localized frequency variation when calculating this histogram 110. More specifically, each pixel value in the original histogram calculated simply from the improved image data 42 is sequentially selected as the target pixel, the average frequency of pixel values in a small predetermined area (such as +/−7 pixels of the target pixel value) is calculated for each target pixel, and this average is used as the frequency of the target pixel value. The average can be calculated as a simple average or a weighted average. This removes small frequency variations in the original histogram, and results in a histogram 110 with a smooth frequency curve such as shown in the figure. Note that this averaging process slightly narrows the effective range of the histogram 110 from the full range of pixel values 0 to 255. If the density range used for averaging is the range +/−7 of the target pixel value, the effective range of the histogram 110 will be from a pixel value of 7 to a pixel value of 248.

The slope f'(i) (the ratio of the frequency change to the pixel value frequency) of the histogram 110 is then calculated for each pixel value i. This slope f'(i) can be calculated using the following equation shown in FIG. 11, for example.

Equation 1 where f(i) is the frequency of pixel value n (the number of pixels of pixel value n). This equation yields the slope f'(i) of pixel i as the slope of the line having a distance error from a frequency plot of five dots in a range of i+/−2 from pixel value i minimized by a least squares method. This range of i+/−2 from pixel value i is used by way of example only, and a wider or narrower range can be used.

The threshold level Pth is then calculated using steps (1) to (4) below.

(1) Finding Black Transition Point Pmin

As indicated by arrow 112 in FIG. 9, the slope f'(i) of the histogram 110 at each pixel value i is checked while sequentially incrementing pixel value i from the minimum density level (that is, while tracing the histogram 110 from the maximum density level sequentially towards the lowest density level) to find the pixel value i where $$f'(i)*f'(i+1)<=0, \text{ and}$$

$$f'(i)<0, \text{ and}$$

$$f'(i+1)>=0.$$

The pixel value i where these conditions are true is defined as black transition point Pmin. The black transition point Pmin is therefore the transition point where the slope changes from descending to ascending or level when the histogram 110 is traced from the maximum density level sequentially towards the lowest density level.

As will known by comparing FIG. 8 and FIG. 9, the black transition point Pmin defined in this way is near the end point 105 on the low density side of the histogram 104 for the foreground image shown in FIG. 8, and may be offset slightly towards the high density side from this end point 105.

If black transition point Pmin cannot be set by this method (that is, if a pixel value i satisfying these conditions is not found), a predefined pixel value U is used as the black transition point Pmin. This pixel value U is the pixel value known from experience to be near or offset slightly to the low density side of the low density end point of the foreground image histogram 104. When reading checks, this pixel value U is a close to ¼ from the high density end of the total range of pixel values from 0 to 255, or pixel value 64.

(2) Finding White Transition Point Pmax

As indicated by arrow 114 in FIG. 9, the slope f'(i) of the histogram 110 at each pixel value i is checked while sequentially decrementing pixel value i from the maximum density level (that is, while tracing the histogram 110 from the minimum density level sequentially towards the highest density level) to find the pixel value i where $$f'(i-1)*f'(i)<=0, \text{ and}$$

$$f'(i)>0, \text{ and}$$

$$f'(i-1)<=0.$$

The pixel value i where these conditions are true is defined as the provisional white transition point. The provisional white transition point is therefore the transition point where the slope changes from ascending to descending or level when the histogram 110 is traced from the minimum density level sequentially towards the highest density level.

As indicated by arrow 116 in FIG. 9, the tracing direction is then reversed from this provisional white transition point while incrementing the pixel value i and checking the slope f'(i) to find the first pixel value i where $$f'(i)>Y$$

where Y is a predetermined positive value indicating a suitable gentle positive slope f'(i). The pixel value i where this last condition is true is defined as white transition point Pmax.

The following additional conditions can also be considered when setting the white transition point Pmax using this method. More specifically, the white transition point Pmax is not defined for pixel values where the cumulative frequency of the histogram 110 in the pixel range on the lower density side (the pixel value is greater) is less than a predefined value V. This value V is equal to or slightly less than the total number of pixels in the background image. In the case of a check, this is equal to approximately 75% of the total number of pixels in the check image. Applying this additional condition avoids setting the white transition point Pmax at a point separated noticeably to the low density side from the low density end point 105 of the foreground image histogram 104 shown in FIG. 8.

As will be known by comparing FIG. 9 and FIG. 8, the likelihood is high that the white transition point Pmax set as described above is found near the low density end point 105 of the foreground image histogram 104 shown in FIG. 8 or offset slightly to the low density side from this end point 105. In addition, the likelihood is high that the black transition point Pmin is found at a position offset slightly to the high density side from the low density end point 105 of the foreground image histogram 104 shown in FIG. 8. The likelihood that the low density end point 105 of the foreground image histogram 104 is between black transition point Pmin and white transition point Pmax, and if threshold level Pth is set near this end point 105, the background image and foreground image can be separated relatively well by the two-level conversion process.

Described in another way, finding black transition point Pmin and white transition point Pmax as described above is effectively the same as finding the boundary or junction between the foreground image histogram 104 and the background image histogram 106. Setting the threshold level Pth in this junction therefore enables separating the background image and foreground image by means of two-level conversion efficiently with good results.

(3) Calculating the Threshold Level Pth

If Pmin <=Pmax, Pth=Pmin+(Pmax−Pmin)*W where coefficient W is a specific positive value less than 1, such as approximately 0.5. More specifically, threshold level Pth is set between black transition point Pmin and white transition point Pmax.

However, if Pmin>Pmax, Pth=Pmax*X where coefficient X is a specific positive value of 1 or more, such as a value greater than or equal to 1 and less than 2. More specifically, threshold level Pth is set to a value offset slightly to the low density side from white transition point Pmax (and in most cases is between black transition point Pmin and white transition point Pmax).

(4) Correcting Threshold Level Pth

If the cumulative frequency of the histogram 110 in the pixel range on the high density side of threshold level Pth (the pixel values are smaller values) is greater than the predetermined value Y, the threshold level Pth is shifted towards the high density side to correct the threshold level Pth so that this cumulative frequency is less than or equal to value Y. However, threshold level Pth is not set to a pixel value less than a predetermined lower limit Z (is not set to a pixel level of a density greater than lower limit Z). This value Y is set from experience to a level equal to or slightly greater than the total number of pixels in the foreground image. In the case of a check, for example, Y can be set to approximately 25% of the total number of pixels in the check image. Lower limit Z is set to a pixel value where experience has shown that the low density end point 105 of the foreground image histogram 104 cannot be on the high density side (the low pixel value side) of Z, and is slightly greater than the pixel value U (equal to approximately 64 for processing checks, for example) used to set the black transition point Pmin.

As will be known from comparing FIG. 8 and FIG. 9, this process sets the threshold level Pth near the low density end point 105 of the foreground image histogram 104. The greater part of the background image is removed and the greater part of the foreground image is extracted by two-level converting the improved image data 42 using this threshold level Pth.

Figure 10:
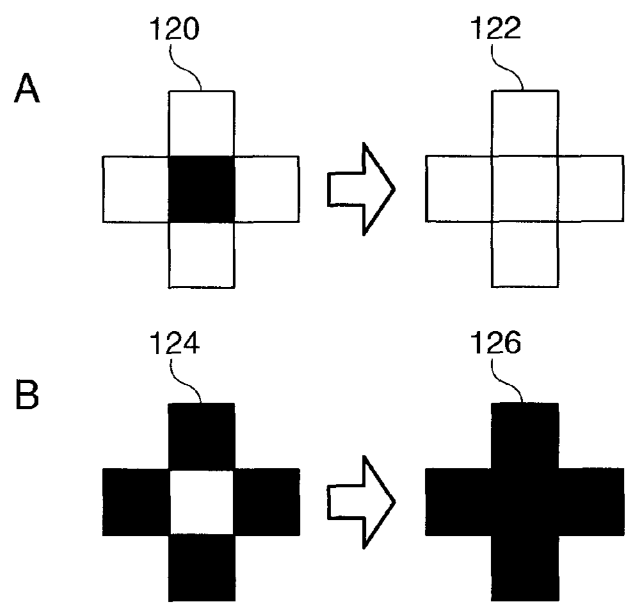
FIG. 10 describes a noise removal process.

FIG. 10 describes a noise removal method.

This method scans all of the two-level image data to find density patterns 120 as shown in FIG. 10A and density patterns 124 as shown in FIG. 10B. Both density patterns 120 and 124 are typical noise density patterns. In density patterns 120 there is one black pixel with the four vertically and horizontally adjacent pixels white, representing black dot noise in a white field. Density patterns 124 are the reverse with one white pixel and four vertically and horizontally adjacent black pixels, representing white dot noise in a black field. If density pattern 120 is found, it is converted to a white pattern density pattern 122 of all white pixels, thus removing the black dot noise. Likewise, if density pattern 124 is found, it is converted to a black pattern 126 of all black pixels, thus removing the white dot noise.

The invention has been described with reference to a preferred embodiment by way of example only, and the invention is not limited to this embodiment. It will be obvious to one with ordinary skill in the related art that the invention can be modified in many ways without departing from the scope of the accompanying claims.

Methods other than image sharpening or contrast enhancement can be used together with image sharpening or contrast enhancement as the density improvement method, or methods other than image sharpening and contrast enhancement can be used instead.

The histogram of the density distribution of the improved image data used to calculate the threshold level can be generated using all pixels in the improved image data, or the histogram can be generated using only a subset of the pixels in the improved image data in order to reduce the processing load. For example, an image area can be selected from a part of the improved image data and the histogram can be generated from the pixels in this partial image area. Alternatively, the pixel size of the improved image data can be compressed using a known method, and the histogram can be generated based on the pixels in the compressed improved image data. Further alternatively, pixels at a specified interval can be sampled in the raster scan direction from the improved image data as representative pixels, and the histogram can be generated using these sampled pixels.

In an image of a check or similar financial instrument that is processed by this embodiment of the invention, the payment information that is the foreground image is normally written in black, dark blue, or other dense color while most of the background image is generally printed in a lower density color than the foreground image. However, the image processing method of this invention can also be applied when this density relationship of the background image and foreground image is reversed.

The present invention can also be used when the density range of the background image is in the middle of the overall density range of pixel levels ranging from 0 to 255 and the density range of the foreground image is near the opposite ends of the overall density range, and when this density relationship is reversed. In this situation the complete range of pixel levels from 0 to 255 in the raw image data is not processed at once. Instead, a number of partial density ranges are set so that the density ranges of the background image and foreground image can be easily separated, and the method of this invention is applied separately to each of these ranges.

For example, the density range of the background image is the intermediate density range of pixel levels 30 to 220, and the density range of the foreground image is the high density range of pixel levels 0 to 50 and the low density range of pixel levels 200 to 255. A first density processing range of 0 to N1 (where $N1<200$) and a second density processing range of N2 to 255 (where $N2>50$) are set, and the image processing method of the invention (that is, density distribution improvement, threshold level setting, and two-level conversion) is applied separately to the raw image data in the first processing range 0 to N1 and the second processing range N2 to 255. When processing the first processing range 0 to N1, all pixels with a density level lower than pixel value N1 in the raw image data are treated as pixel value N1, and when processing the second processing range N2 to 255, all pixels with a density level greater than pixel value N2 in the raw image data are treated as pixel value N2. In the binary image data resulting from processing the first processing range 0 to N1, the parts of the foreground image in the high density levels 0 to 50 are separated and extracted from the background image. In the binary image data resulting from processing the second processing range N2 to 255, the parts of the foreground image in the low density levels 200 to 255 are separated and extracted from the background image.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An image processing apparatus comprising:

a density distribution improvement means for receiving grayscale raw image data containing both background image information and foreground image information, modifying a density distribution of the raw image data to increase a difference between a density distribution range of the background image information and a density distribution range of the foreground image information, and generating grayscale improved image data;

a threshold level calculation means for receiving the improved image data and calculating a threshold level for two-level digital conversion based on a density distribution in the improved image data; and a digitizing means for receiving the improved image data and the threshold level, digitizing the improved image data using the threshold level, and outputting two-level image data.

2. The image processing apparatus described in claim 1, wherein the density distribution improvement means applies an image sharpening process to the raw image data.

3. The image processing apparatus described in claim 2, further comprising a noise removal means for receiving the two-level image data and removing noise from the two-level image data.

4. The image processing apparatus described in claim 1, wherein the threshold level calculation means detects a junction between a density range of the background image of the improved image data and a density range of the foreground image of the improved image data, and sets the threshold level within the junction.

5. The image processing apparatus described in claim 4, wherein the threshold level calculation means calculates a histogram for the improved image data, and detects the junction from slopes in the histogram.

6. The image processing apparatus of claim 5, wherein a starting point of the junction adjoining the foreground image data is defined by determining where the density distribution of the foreground image changes from descending to ascending or level.

7. The image processing apparatus of claim 5, wherein an end point of the junction adjoining the background image data is defined by first identifying a provisional end point as the point where the density distribution of the background image changes from ascending to descending or level, and then determining the slope of the background image density from the provisional end point toward an apex of the background image density, and identifying said end point as a point where the slope is determined to be not less than a predefined positive value.

8. The image processing apparatus described in claim 4, wherein the threshold level calculation means calculates a histogram for the improved image data, finds transition points in the histogram for transitioning between background and foreground image information, and sets the threshold level based on the transition points.

9. An image processing apparatus, comprising:

a density distribution improvement module coupled to receive grayscale raw image data containing both background image information and foreground image information, said density distribution improvement module modifying a density distribution of the raw image data to increase a difference between a density distribution range of the background image information and a density distribution range of the foreground image information, and generating grayscale improved image data;

a threshold level calculation module coupled to receive the improved image data and calculate a threshold level for two-level digital conversion based on a density distribution in the improved image data; and a digitizing module coupled to receive the improved image data and the threshold level, digitize the improved image data using the threshold level, and output two-level image data.

10. The image processing apparatus described in claim 9, wherein the density distribution improvement module further applies an image sharpening process to the raw image data.

11. The image processing apparatus described in claim 10, further comprising a noise removal module coupled to receive the two-level image data and remove noise from the two-level image data.

12. The image processing apparatus described in claim 9, wherein the threshold level calculation module detects a junction between a density range of the background image of the improved image data and a density range of the foreground image of the improved image data, and sets the threshold level within the junction.

13. The image processing apparatus described in claim 12, wherein the threshold level calculation module calculates a histogram for the improved image data, and detects the junction from slopes in the histogram.

14. The image processing apparatus of claim 13, wherein a starting point of the junction adjoining the foreground image data is defined by determining where the density distribution of the foreground image changes from descending to ascending or level.

15. The image processing apparatus of claim 13, wherein an end point of the junction adjoining the background image data is defined by first identifying a provisional end point as a point where the density distribution of the background image changes from ascending to descending or level, and then determining the slope of the background image density from the provisional end point toward an apex of the background image density, and identifying said end point as the point where the slope is determined to be greater than a predefined positive value.

16. The image processing apparatus described in claim 12, wherein the threshold level calculation means calculates a histogram for the improved image data, finds transition points in the histogram for transitioning between background and foreground image information, and sets the threshold level based on the transition points.

17. An image processing method comprising:

a density distribution improvement step for receiving grayscale raw image data containing both background image information and foreground image information; modifying a density distribution of the raw image data to increase a difference between a density distribution range of the background image information and a density distribution range of the foreground image information, and generating grayscale improved image data;

a threshold level calculation step for receiving the improved image data and calculating a threshold level for two-level digital conversion based on a density distribution in the improved image data; and a digitizing step for receiving the improved image data and the threshold level, digitizing the improved image data using the threshold level, and outputting two-level image data.

18. The image processing method described in claim 17, wherein the density distribution improvement step further applies an image sharpening process to the raw image data.

19. The image processing method described in claim 18, further comprising a noise removal step for receiving the two-level image data and removing noise from the two-level image data.

20. The image processing method described in claim 17, wherein the threshold level calculation step detects a junction between a density range of the background image of the improved image data and a density range of the foreground image of the improved image data, and sets the threshold level within the junction.

21. The image processing method described in claim 20, wherein the threshold level calculation step calculates a histogram for the improved image data, and detects the junction from slopes in the histogram.

22. The image processing method of claim 21, wherein a starting point of the junction adjoining the foreground image data is defined by determining where the density distribution of the foreground image changes from descending to ascending or level.

23. The image processing method of claim 21, wherein an end point of the junction adjoining the background image data is defined by first identifying a provisional end point as the point where the density distribution of the background image changes from ascending to descending or level, and then determining the slope of the background image density from the provisional end point toward an apex of the background image density, and identifying said end point as a point where the slope is determined to be not less than a predefined positive value.

24. The image processing method described in claim 20, wherein the threshold level calculation step calculates a histogram for the improved image data, finds transition points in the histogram for transitioning between background and foreground image information, and sets the threshold level based on the transition points.

* * * * *